United States Patent [19]

Mike et al.

[11] Patent Number: 5,616,153

[45] Date of Patent: *Apr. 1, 1997

[54] COPOLYMER DISPERSANTS VIA VINYL TERMINATED PROPENE POLYMERS

[75] Inventors: Carl A. Mike, Chesterfield; Joseph J. Valcho, Richmond; Daniel Yuan-Fu Yu, Midlothian, all of Va.

[73] Assignee: Ethyl Corporation, Richmond, Va.

[ * ] Notice: The portion of the term of this patent subsequent to Jun. 16, 2013, has been disclaimed.

[21] Appl. No.: 538,310

[22] Filed: Oct. 3, 1995

[51] Int. Cl.$^6$ ...................................................... C10L 1/18
[52] U.S. Cl. ................................. 44/331; 44/393; 44/394; 508/235; 508/466; 525/301; 525/322; 525/337; 525/340; 525/343; 525/344; 525/374; 525/379; 525/380; 525/381; 525/386
[58] Field of Search ..................................... 525/301, 322, 525/337, 340, 343, 344, 374, 379, 380, 381, 386; 44/393, 394, 331; 252/56 R, 51.5 A; 508/235, 466; C10M 133/56

[56] References Cited

U.S. PATENT DOCUMENTS

| | | | |
|---|---|---|---|
| 4,542,199 | 9/1985 | Kaminsky et al. | 526/160 |
| 4,658,078 | 4/1987 | Slaugh et al. | 585/512 |
| 4,814,540 | 3/1989 | Watanabe et al. | 585/523 |
| 5,112,507 | 5/1992 | Harrison . | |
| 5,229,022 | 7/1993 | Song et al. . | |
| 5,324,800 | 6/1994 | Welborn, Jr. et al. | 526/160 |
| 5,433,875 | 7/1995 | Rollin et al. | 252/51.5 R |
| 5,435,926 | 7/1995 | Gutierrez et al. . | |

FOREIGN PATENT DOCUMENTS

| | | | |
|---|---|---|---|
| 0490454 | 6/1992 | European Pat. Off. . | |
| 657475A1 | 12/1994 | European Pat. Off. | C08F 8/46 |
| 93/24539A1 | 12/1993 | WIPO | C08F 8/00 |
| 95/07944A1 | 3/1995 | WIPO | C08F 210/14 |

OTHER PUBLICATIONS

Article –J. Am. Chem. Soc. 1994, 116,10015–10031 "Cationic Zirconocene Olefin Polymerization Catalysts Based on the Organo–Lewis Acid Tris (pentafluorophenyl)borane. A Synthetic, Structural, Solution Dynamic, and Polymerization Catalytic Study" (Yang et al.) Date Unknown.

*Primary Examiner*—Prince Willis, Jr.
*Assistant Examiner*—Cephia D. Toomer
*Attorney, Agent, or Firm*—Dennis H. Rainear

[57] ABSTRACT

A novel copolymer of an unsaturated acidic reactant and an atactic vinyl terminated propene polymer (VTPP) and its use in preparation of fuel and lubricant additives is taught. The VTPP has a major amount of polymer chains containing terminal vinyl unsaturation, a number average molecular weight of at least 500, and comprises at least 70 weight per cent propene and 0 to 30 weight per cent of at least one olefin selected from the group consisting of $C_2$ and $C_4$ to $C_{10}$ olefins. The unsaturated acidic reactant comprises at least one unsaturated $C_4$ to $C_{10}$ carboxylic or dicarboxylic acid or anhydride. An oil soluble dispersant additive of the invention useful in oleaginous compositions is prepared by contacting the atactic VTPP copolymer with at least one nucleophilic reagent selected from the group consisting of amines, alcohols, metal reactants and mixtures thereof under conditions effective to form adducts of the nucleophilic reagent with the copolymer. The novel dispersants made from the copolymers and terpolymers of the invention can be polymeric succinic ester-amide dispersants, polymeric succinimide dispersants, polymeric succinic amide-triazole dispersants, or polymeric succinic triazole dispersants. Fuel and lubricant compositions containing such additives are a part of the invention.

62 Claims, No Drawings

COPOLYMER DISPERSANTS VIA VINYL TERMINATED PROPENE POLYMERS

BACKGROUND OF THE INVENTION

(1) Field of the Invention

This invention relates to novel chemical processes and compositions, particularly the utilization of novel copolymers of vinyl terminated propene polymers and activated unsaturated monomers, such as maleic anhydride, as intermediates for lubricant and fuel additives. Copolymers of the atactic polymers with activated unsaturated monomers such as maleic anhydride, and functionalization of the resulting intermediate copolymer compositions to provide effective lubricant and fuel additives are included in the invention. These compositions are useful as intermediates for dispersants used in lubricating oil compositions or as dispersants themselves. The dispersants of the present invention also advantageously impart fluidity modifying properties to lubricating oil compositions which are sufficient to allow elimination of some proportion of viscosity index improver from the lubricating oil compositions which contain these dispersants.

(2) Description of Related Art

Chemical additives for lubricating oils are used to control the physical and chemical properties of the oils. These additives are used to modify oil viscosity and viscosity index, to make the oils more resistant to oxidation, and to keep engines and other mechanical equipment clean and protected against corrosion and wear, and keep particulate matter dispersed to minimize or eliminate sludge and deposits.

Hydrocarbon-based chemical additives are designed for specific functions by choosing a hydrocarbon type and molecular weight range or molecular weight distribution to allow the additives to function in the fluid type of interest. For instance, high molecular weight polymers can be used to increase viscosity and viscosity index of mineral oils or synthetic oils. Polar head groups can be designed to be attached to low or high molecular weight hydrocarbon tails to achieve detergency, dispersancy, antiwear or anticorrosion performance.

Extensive use has been made of ethylene and butene or isobutylene oligomers in forming oil additives. High molecular weight ethylene-propylene olefin copolymers are commonly used to increase the viscosity index of lubricating oils. See, for example, U.S. Pat. No. 5,151,204 to Struglinski.

Free radical polymerization of vinylidene containing polymer with unsaturated acidic monomers is detailed in U.S. Pat. No. 5,112,507 to Harrison. Therein, at least about 20 percent of the total high molecular weight olefin comprises the alkylvinylidene isomer, the resulting copolymer product having alternating succinic and polyalkyl groups. Preferred high molecular weight olefins therein include polyisobutenes, especially polyisobutenes in which the alkylvinylidene isomer comprises at least 50 percent of the total olefin.

WO-A 95/07944 discloses the free radical polymerization of unsubstituted α-olefin based oligomer, an unsubstituted dicarboxylic acid or anhydride, and a monounsaturated compound to obtain a terpolymer for use as fuel and lubricant additive intermediates.

Alkenyl-substituted succinic anhydrides have been used as dispersants. Such alkenyl-substituted succinic anhydrides have been prepared by two different processes, a thermal process, referred to herein as "ene chemistry" (see, e.g., U.S. Pat. No. 3,361,673) and a chlorination process (see, e.g., U.S. Pat. No. 3,172,892). The polyisobutenyl succinic anhydride ("PIBSA") produced by the thermal process has been characterized to contain a double bond in the product. The chlorination process PIBSAs have been characterized as monomers containing either a double bond, a ring, other than a succinic anhydride ring and/or chlorine in the product. See J. Weill and B. Sillion, "Keaction of Chlorinated Polyisobutene with Maleic Anhydride:Mechanism Catalysis by Dichloromaleic Anhydride", Revue de l'Institut Francais du Petrole, Vol. 40, No. 1, pp. 77–89 (January-February, 1985). Such compositions include one-to-one monomeric adducts (see, e.g., U.S. Pat. Nos. 3,219,666; 3,381,022) as well as adducts having polyalkenyl-derived substituents adducted with at least 1.3 succinic groups per polyalkenyl-derived substituent (see, e.g., U.S. Pat. No. 4,234,435 to Meinhardt). PIBSA serves as a ubiquitous precursor to several commercial crankcase ashless dispersants, including succinimides, succinates, succinate esters, and triazoles.

U.S. Pat. No. 5,435,926 to Gutierrez et al. discloses ethylene-alpha-olefin copolymers including ethylene-propylene copolymers, but requires an average of at least about 30% of the polymer chains to contain terminal ethenylidene unsaturation. The disclosed copolymers are used to make alkenyl succinic anhydrides via ene chemistry. Only a minor amount of the polymer chains can contain terminal ethenyl, or vinyl, unsaturation. Also disclosed is the use of metallocene catalysts for production of ethylene-propylene copolymers containing high levels of terminal ethenylidene unsaturation.

Despite the vast amount of work conducted heretofore, a need exists for novel ashless dispersants that can enable use of smaller amounts of viscosity index improvers in formulating finished lubricants, giving a cost reduction. Because of the relatively high temperatures to which finished lubricating oils are exposed during actual service conditions, improved thermal stability is a desirable property in ashless dispersants. The advantages of having an ashless dispersant which contributes viscosity increase to the lubricant and thus reduces the amount of viscosity index improver needed in the finished oil is referred to, for example, in U.S. Pat. No. 4,234,435.

SUMMARY OF THE INVENTION

A novel copolymer of an unsaturated acidic reactant and an atactic vinyl terminated properie polymer (VTPP) and its use in preparation of fuel and lubricant additives is taught. The VTPP has a major amount of polymer chains containing terminal vinyl unsaturation, a number average molecular weight of at least 500, and comprises at least 70 weight per cent properie and 0 to 30 weight per cent of at least one olefin selected from the group consisting of $C_2$ and $C_4$ to $C_{10}$ olefins. The unsaturated acidic reactant comprises at least one unsaturated $C_4$ to $C_{10}$ carboxylic or dicarboxylic acid or anhydride. An oil soluble dispersant additive of the invention useful in oleaginous compositions is prepared by contacting the atactic VTPP copolymer with at least one nucleophilic reagent selected from the group consisting of amines, alcohols, metal reactants and mixtures thereof under conditions effective to form adducts of the nucleophilic reagent with the copolymer. The novel dispersants made from the copolymers and terpolymers of the invention can be polymeric succinic ester-amide dispersants, polymeric succinimide dispersants, polymeric succinic amide-triazole dispersants, or polymeric succinic triazole dispersants. Fuel and lubricant compositions containing such additives are a part of the invention.

DESCRIPTION OF THE PREFERRED EMBODIMENT

The novel chemical processes and compositions of the invention provide important intermediates for lubricant and fuel additives. The novel copolymers of α-olefin, or vinyl, terminated polymers and unsaturated acidic reactant, such as maleic anhydride, are useful for fuel and lubricant additives, and provide novel dispersant chemistries which afford significant viscometric advantages. These copolymers and dispersants made therefrom have advantageous viscosity modifying properties, and provide a viscosity index credit ("VI Credit") when used in lubricating oils, which permits elimination of at least some portion of viscosity index improver ("VI Improver") from multigrade lubricating oils containing the same. Dispersants imparting VI Credit to formulations allow the use of lower amounts of conventional VI improvers, thus affording lower overall treat cost to lubricant formulations. Dispersants of the invention give lower viscosities at lower temperatures as shown by cold crank simulator (CCS) viscosity measurements and provide important fuel economy benefits and are compatible with fluroelastomer seals.

Preparation of starting atactic vinyl terminated propene polymer ("VTPP")

Essential to the invention is formation of a copolymer of an atactic, or stereo-irregular, vinyl terminated propene polymer ("VTPP") and an unsaturated acidic reactant. The term "vinyl terminated" means that the propene polymer has a major portion of polymer chains containing terminal vinyl unsaturation. Preferably, the atactic propene polymer has an average of at least 70% of polymer chains containing terminal vinyl unsaturation, more preferably at least 90%. The vinyl terminated polymers useful for the invention are characterized herein as "high molecular weight α-olefin" (HMWα) polymers, which refers to vinyl terminated polymers of sufficient molecular weight and chain length to lend solubility in lubricating oil to the copolymer reaction product. Terminal vinyl unsaturation is also referred to herein as 1-olefin or α-olefin vinyl unsaturation, and is shown by the general formula:

POLY-CH=CH$_2$.

The starting atactic VTPP must have a sufficient number of carbon atoms such that the copolymer resulting from reaction of VTPP with the unsaturated acidic reactant as described below is soluble in lubricating oil, the VTPP preferably having a number average molecular weight of at least 500, for example from 500 to 10,000, more preferably from 500 to 5,000. The starting atactic VTPP for forming the copolymer may be homopolymer or comprise minor amounts of olefin comonomers. For example, the starting atactic propene polymer preferably comprises at least 70 weight per cent propene and 0 to 30 weight per cent of at least one olefin selected from the group consisting of $C_2$ and $C_4$ to $C_{10}$ olefins. For the propene/olefin copolymers, it is preferred that a major portion of the olefin comonomers be 1-olefin, more preferably at least 90% of the olefin comonomers be 1-olefin.

The starting atactic VTPP can be obtained by polymerization of propene, and optionally minor amounts of olefin comohomers selected from $C_2$ and $C_4$ to $C_{10}$ olefins, in the presence of a co-catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the atactic VTPP can be selected from organometallic coordination compounds which are cyclopentadienyl derivatives of a Group 4b metal and include mono, di- and tricyclopentadienyls and their derivatives of the transition metals. Particularly useful to obtain the desired starting atactic VTPP are the hindered alkyl metallocenes of zirconium and hafnium, particularly bis(pentamethylcyclopentadienyl)zirconium dichloride and bis(pentamethylcyclopentadienyl)hafnium dichloride. The alumoxanes employed in forming the reaction product with the metallocenes are themselves the reaction products of an organoaluminum compound with water, for example methylaluminoxane. While there may be other metallocene catalysts which provide the desired selectivity, the substituted cyclopentadienyl hafnocene and zirconocene provided above have been found to be particularly effective. The metallocene and alumoxane cocatalyst systems are known in the art and are shown in, for example, U.S. Pat. Nos. 4,542,199; 4,814,540 and 5,324,800; also H. Siinn, W. Kaminsky, H. J. Vollmer, and R. Woldt, Angew. Chem. Int Ed. Engl vol 19, p 390 (1980) polyethylene; W. Kaminsky, K. Kulper, W. H. Brintzinger, and F. R. W. P. Wild, Ang. Chem. vol 24, p507 (1985) polypropene down to 800 Mn.

Unsaturated Acidic Reactant

The unsaturated acidic reactant useful in the preparation of the copolymers of the present invention comprises at least one unsaturated $C_4$ to $C_{10}$ carboxylic acid or anhydride or acid derivative, preferably dicarboxylic acid or anhydride or acid derivative, for example maleic or fumaric acid or anhydride or acid derivative selected from the group consisting of acid chloride, acid bromide, and lower alkyl acid derivatives. The unsaturated acidic reactant preferably comprises a maleic or fumaric reactant of the general formula:

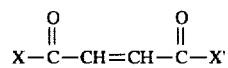

$$X-\overset{O}{\overset{\|}{C}}-CH=CH-\overset{O}{\overset{\|}{C}}-X'$$

wherein X and X' are the same or different, provided that at least one of X and X' is a group that is capable of reacting to esterify alcohols, form amides or amine salts with ammonia or amines, form metal salts with reactive metals or basically reacting metal compounds and otherwise function to acylate. Typically, X and/or X' is —OH, —O-hydrocarbyl, —OM<+> where M<+> represents one equivalent of a metal, ammonium or amine cation, —NH$_2$, —Cl, —Br, and taken together X and X'<—> can be —O— so as to form an anhydride. Preferably, X and X' are such that both carboxylic functions can enter into acylation reactions. Preferred are acidic reactants where X and X' are each independently selected from the group consisting of —OH, —Cl, —O— lower alkyl and when taken together, X and X' are —O—. Other suitable acidic reactants include electron-deficient olefins such as monophenyl maleic anhydride; monomethyl, dimethyl, monochloro, monobromo, monofluoro, dichloro and difluoro maleic anhydride; N-phenyl maleimide and other substituted maleimides; isomaleimides; fumaric acid, fumaric anhydride, maleic acid, alkyl hydrogen maleates and fumarates, dialkyl fumarates and maleates, fumaronilic acids and maleanic acids; and maleonitrile, and fumaronitrile. Preferred unsaturated acidic reactants include maleic anhydride and maleic acid. The particularly preferred acidic reactant is maleic anhydride.

General Preparation of the Copolymer

The atactic VTPP prepared as described above copolymerizes with the unsaturated acidic reactant under free radical conditions in the presence of a free radical initiator. A representation for this reaction is shown below for propene homopolymer with the selection of maleic anhydride (MAN) as the unsaturated acidic reactant:

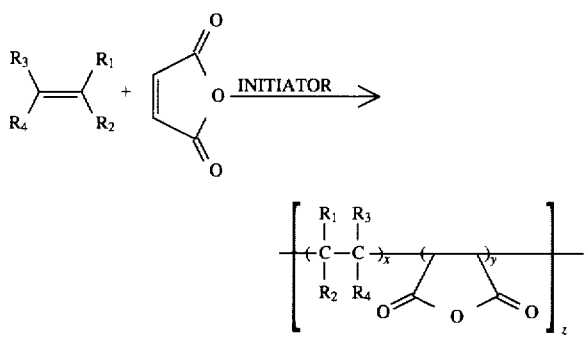

Where x, y, and z independently are integers $\geq 1$, and $R_1$, $R_2$, $R_3$, $R_4$ are selected from hydrogen and polyalkyl, provided that one of substituents $R_1$, $R_2$, $R_3$, $R_4$ is polyalkyl and the remaining three substituents are hydrogen.

This reaction is represented below more generally for propene homopolymer with the unsaturated acidic reactant being more broadly defined:

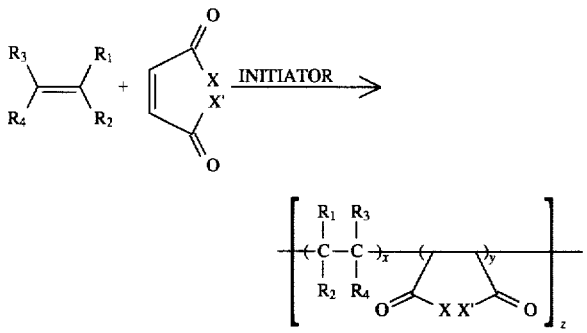

Where x, y, and z independently are integers $\geq 1$, and $R_1$, $R_2$, $R_3$, $R_4$ are selected from hydrogen and polyalkyl, provided that one of substituents $R_1$, $R_2$, $R_3$, $R_4$ is polyalkyl and the remaining three substituents are hydrogen. X and X' independently are as defined in the section Unsaturated Acidic Reactant above.

The inventive reaction product illustrated, a copolymer of atactic VTPP and MAN (VTPP/MAN copolymer) and other copolymers of the invention, are novel dispersant precursors distinct from conventional PIBSA's generated via thermal ene reactions and by chloronation followed by reaction with MAN. The vinyl termination of the VTPP/MAN copolymer makes it also distinct from copolymers in the prior art produced by free radical conditions but utilizing vinylidene olefin polymer. Copolymerization of VTPP (Mn about 1000) with MAN give high acid number products (0.91 to 1.99 meq KOH/g). VTPP (Mn about 1500 give copolymers with acid numbers up to about 1.6 meq KOH/g. Higher molecular weight analogues of VTPP (Mn 2300–2700) afford lower acid number products (0.0–0.85 meq KOH/g). For Acid Value Determination herein, the copolymer sample is dissolved in a 1:1 toluene:n-butanol mixture and titrated with a sodium isopropoxide titrant to its potentiometric endpoint. The total acid number is then calculated and divided by 56.1 to give the acid value in milliequivalents KOH/gram.

The VTPP/MAN copolymerization free radical reaction may be conducted at a temperature of about –30° C. to about 210° C., preferably from about 40° C. to about 150° C. Degree of polymerization is inversely proportional to temperature. Accordingly, for the preferred high molecular weight copolymers, it is advantageous to employ lower reaction temperatures, with temperatures of about 40° to 150° C. being preferred. In contrast, as shown in Comparative Example 1, the VTPP does not appreciably react with MAN, even at 150° C., in the absence of a free radical catalyst or initiator, as evidenced by the low acid number.

In the past, higher levels of maleic anhydride have been incorporated by first chlorinating the polymer (usually polyisobutene). Examples are provided in U.S. Pat. No. 4,234,435, as described at column 16 lines 4–19. Temperatures of 120° to 260° C., preferably 160° to 249° C. are specified in U.S. Pat. No. 5,229,022 at column 13 line 62. Chlorination is costly, and additives not containing chlorine are now considered to be less harmful to the environment.

The copolymerization reaction may be conducted neat, that is, the VTPP, acidic reactant and the free radical initiator are combined in the proper ratio, and then stirred at the reaction temperature. Alternatively, the reaction may be conducted in a diluent. For example, the reactants may be combined in a solvent. Suitable solvents include those in which the reactants and free radical initiator are miscible and include acetone, tetrahydrofuran, chloroform, methylene chloride, dichloroethane, toluene, dioxane, chlorobenzene, xylenes, and the like. After the reaction is complete, volatile components may be stripped off. When a diluent is employed, it is preferably inert to the reactants and products formed and is generally used in an amount sufficient to ensure efficient stirring.

In general, the copolymerization can be initiated by any free radical initiator. Such initiators are well known in the art. However, the choice of free radical initiator may be influenced by the reaction temperature employed. The preferred free-radical initiators are the peroxide-type polymerization initiators and the azo-type polymerization initiators. Radiation or photolysis can also be used to initiate the reaction, if desired.

The peroxide-type free-radical initiator can be organic or inorganic, the organic having the general formula: $R_3OOR_3'$ where $R_3$ is any organic radical and $R_3'$ is selected from the group consisting of hydrogen and any organic radical. $R_3$ and $R_3'$ are organic radicals, preferably hydrocarbon, aroyl, and acyl radicals, carrying, if desired, substituents such as halogens, etc. Preferred peroxides include di-tert-butyl peroxide, tert-butyl peroxybenzoate, and dicumyl peroxide. Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by 1,1'-azobisisobutyronitrile, are also well-known free-radical promoting materials. These azo compounds can be defined as those having present in the molecule group —N=N wherein the valances are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and phenyldiazonium halides. A suitable list of azo-type compounds can be found in U.S. Pat. No. 2,551,813 to Pinkney.

The amount of initiator to employ, exclusive of radiation, of course, depends to a large extent on the particular initiator chosen, the high molecular olefin used and the reaction conditions. The initiator is preferably soluble in the reaction medium. The usual concentrations of initiator are between 0.001:1 and 0.2:1 moles of initiator per mole of acidic reactant, with preferred amounts between 0.005:1 and 0.2:1.

The polymerization temperature must be sufficiently high to break down the initiator to produce the desired free-radicals. For example, using benzoyl peroxide as the initiator, the reaction temperature can be between about 75° C. and about 90° C., preferably between about 80° C. and about 85° C. Higher and lower temperatures can be employed, a suitable broad range of temperatures being between about −30° C. and about 210° C., with preferred temperatures between about 40° C. and about 150° C. The reaction pressure should be sufficient to maintain the solvent in the liquid phase, but the preferred pressure is atmospheric. The reaction time is usually sufficient to result in the substantially complete conversion of the acidic reactant and VTPP to copolymer. The reaction time is suitable between one and 24 hours, with preferred reaction times between two and ten hours.

As noted above, the subject reaction is a solution-type polymerization reaction. The VTPP, acidic reactant, solvent and initiator can be brought together in any suitable manner. The reaction solvent, as noted above, should be miscible with both the acidic reactant and the VTPP. It is preferable to dissolve the acidic reactant and VTPP so as to bring them into intimate contact in the solution polymerization reaction. Suitable solvents include liquid saturated or aromatic hydrocarbons having from six to 20 carbon atoms; ketones having from three to six carbon atoms; and liquid saturated aliphatic dihalogenated hydrocarbons having from one to five carbon atoms per molecule, preferably from one to three carbon atoms per molecule.

The copolymer is conveniently separated from solvent and unreacted acidic reactant by conventional procedures such as phase separation, solvent distillation, precipitation and the like. If desired, dispersing agents and/or cosolvents may be used during the reaction.

General Preparation of Dispersants

The VTPP/MAN copolymer, and other copolymers of the invention, are useful as dispersants themselves and also, importantly, as intermediates in the preparation of other dispersant additives having improved dispersancy and/or detergency properties when employed in a lubricating oil or fuel. The isolated copolymer may be reacted with a nucleophilic agent to form advantageous fuel and lubricant additives, as described below. An oil soluble dispersant additive of the invention useful in oleaginous compositions is prepared, as discussed below, by contacting the atactic VTPP copolymer with at least one nucleophilic reagent selected from the group consisting of mines, alcohols, metal reactants and mixtures thereof under conditions effective to form adducts of the nucleophilic reagent with the copolymer.

As to type, the dispersants of this invention made from the VTPP/MAN copolymer and other copolymers and terpolymers of the invention can be polymeric succinic ester-amide dispersants, polymeric succinimide dispersants, polymeric succinic amide-triazole dispersants, or polymeric succinic triazole dispersants. Process technology that can be adapted for producing these various types of dispersants can be found in the literature. The VTPP/MAN copolymer, and other copolymers of the invention, can be converted into an alkenyl succinic ester-amide type dispersant using conditions such as are described in U.S. Pat. Nos. 3,219,666; 3,282,959; 3,640,904; 4,426,305 and 4,873,009; or into an alkenyl succinimide type dispersants using conditions such as are described in U.S. Pat. Nos. 3,172,892; 3,219,666; 3,272,746; or 4,234,435; or into an alkenyl succinic triazole dispersant or alkenyl succinic amide-triazole dispersant (depending upon reaction proportions employed) using conditions such as are described in U.S. Pat. Nos. 4,908,145 and 5,080,815.

The dispersants of this invention can be post-treated (i.e., reacted) with various posttreating agents such as are referred to in U.S. Pat. Nos. 4,234,435 and 5,137,980. The dispersant additive can be contacted with one or more post-treating agents selected from the group consisting of inorganic or organic phosphorus compounds, inorganic or organic sulfur compounds, boron compounds, and mono- or poly-carboxylic acids and derivatives thereof. Post-treated dispersants of this invention include those which have been berated by reaction with a suitable boron-containing material, such as boric acid or other boron acids, boron oxide, boron trihalides, ammonium borate, super-berated dispersants, etc. Generally speaking, the berated dispersants will contain from about 0.01 to about 1% by weight of boron and preferably from about 0.05 to about 0.5 weight % of boron based on the weight of the active dispersant (i.e., omitting from consideration the weight of any diluent or unreacted components that may be present in the dispersant).

In general, the dispersants producible pursuant to this invention have been shown to have relatively high useful viscosities when employed in lubricating oil, and to possess good dispersancy effectiveness. In addition, dispersants of this invention can be produced having good shear stability. Importantly, dispersants of this invention demonstrate excellent cold crank performance that is improved over dispersants made from polyisobutylene.

Polyamines (including polyether polyamines) and polyhydroxy mines that can be used in forming the dispersants of this invention have at least one amino group in the molecule. Amines of this type and also polyols that can be used in forming ester-amide dispersants of this invention are extensively described in the patent literature, such as, for example U.S. Pat. Nos. 4,234,435, 4,873,009 and 5,137,980. The nucleophilic reagent can be an N-substituted poly(hydroxyalkyl)amine or a mixture of a polyamine and a polyol. The polyamine is preferably one or a mixture of polyamines which has at least one primary amino group in the molecule and which additionally contains an average of at least two other amino nitrogen atoms in the molecule. In principle, any polyamine having at least one primary amino group and an average of at least three amino nitrogen atoms in the molecule can be used in forming the dispersants of this invention. A polyalkylene polyamine containing 3 to 6 amino groups per molecule is an appropriate nucleophilic reagent. Product mixtures known in the trade as "triethylene tetramine", "tetraethylene pentamine", and "pentaethylene hexamine" are preferred examples. These typically contain linear, branched and cyclic components. Such a polyamine may be alkoxylated e.g. by incorporation of 1 to 2 N-substituted $C_2$ or $C_3$ hydroxyalkyl groups per molecule, preferably B-hydroxyethyl groups. Other polyamines can also be used in making the dispersants of the present invention, e.g. aminoguanidine and/or a basic salt thereof, for example aminoguanidine bicarbonate as described in U.S. Pat. No. 4,908,145.

One preferred type of polyamine is comprised of alkylene polyamines such as those represented by the formula:

wherein n is 2 to about 10 (preferably 2 to 4, more preferably 2 or 3, and most preferably 2) and m is 0 to 10, (preferably 1 to about 6) and mixtures thereof. Cyclic polyamines such an aminoalkyl-piperazines, e.g. B-aminoethyl-piperazine, can also be used in the invention. Another preferred type of polyamine is comprised of hydrocarbyl polyamines containing from 10 to 50 weight percent acyclic alkylene polyamines and 50 to 90 weight percent cyclic alkylene polyamines.

Another embodiment of this invention comprises the use of a dispersant effective amount, e.g. from 0.5 to 20% by weight and preferably from 3 to 15% by weight, of a dispersant of this invention in an oil of lubricating viscosity. This provides a viscosity increase to said oil, and thereby enables a reduction in the mount of viscosity index improver otherwise required to achieve a target viscosity. When the lubricant oil composition is subjected to an elevated temperature during use, the dispersant of this invention provides dispersancy without substantial thermal degradation of the dispersant.

A further embodiment of this invention is the use of a VTPP/MAN type copolymer of this invention in forming a dispersant that provides a beneficial viscosity increase in an oil of lubricating viscosity when the dispersant is dissolved therein at a concentration within the range of 0.5 to 20% by weight. Preferred dispersants of this invention are those that have the ability to increase the 100° C. kinematic viscosity of an additive-free base mineral oil that has a 100° C. kinematic viscosity in the range of 5.0 to 5.5 cSt by at least 30%, more preferably by at least 40%, and most preferably by at least 50%, when dissolved therein at a concentration of 2.0 wt % based on the total weight of the resulting solution.

Additionally, a further embodiment of this invention is the use of a VTPP/MAN type copolymer of this invention in forming a dispersant that provides a beneficial minimal viscosity increase in an oil of lubricating viscosity when the dispersant is dissolved therein at a concentration within the range of 0.5 to 20% by weight. Preferred dispersants of this invention are those that have the ability to increase the −20° C. cold crank simulator viscosity of an additive-free base mineral oil that has a −20° C. cold crank simulator viscosity in the range of 19 to 20 poise by no more than 30% when dissolved therein at a concentration of 2.0 wt % based on the total weight of the resulting solution.

The copolymers of the invention are contemplated to include terpolymers, with the addition of a third monomer to the copolymer of unsaturated acidic reactant and atactic propene polymer. For example, an alkylvinylidene olefin (AVDO) may be utilized in the free radical polymerization of unsaturated acidic reactant (e.g. MAN) and atactic propene polymer (VTPP), resulting in a terpolymer of VTPP/MAN/AVDO. An AVDO is of sufficient molecular weight so that the resulting copolymer has desired solubility in fuels or lubricating oil and is characterized by a terminal vinylidene group of the general structure POLY-C(CH$_3$)=CH$_2$. Preferred are polyisobutenes and polypropenes. See U.S. Pat. No. 5,112,507 for disclosure of appropriate alkylvinylidene olefin for inclusion as a third monomer.

Additional suitable third monomers include dienes, polyenes, di- or polyethylenically unsaturated ethers, esters, amines, amides, or other amine derivatives, which are polymerizable with the unsaturated acidic reactant and the atactic propene polymer. These may be utilized in the free radical polymerization of unsaturated acidic reactant (e.g. MAN) and atactic propene polymer (VTPP). Suitable dienes and polyenes contain 4 to 30 carbon atoms, such as hexadiene, octadiene, decadiene, dodecadiene, divinyl benzene, trivinylcyclohexane and mixtures thereof. Suitable di- or polyethylenically unsaturated ethers include divinyl ethers, diallyl ethers, ethylene glycol divinyl ether, and diethylene glycol divinyl ether. Suitable dior polyethylenically unsaturated esters include acrylate or methacrylate esters derived from diols or polyols, such as pentaerythritol diacrylate, pentaerythritol triacrylate, pentaerythritol tetraacrylate, ethylene glycol dimethacrylate, and diethylene glycol dimethacrylate. Suitable di- or polyethylenically unsaturated amines and amine derivatives include diallylamine, triallylamine, diallylformamide, and diallyldimethylammonium chloride. Suitable di- or polyethylenically unsaturated acrylamides include those derived from di- or polyamines, such as methylene bisacrylamide and N,N'-ethylenebisacrylamide. Additional suitable monomers include esters derived from functionalization of di- or polycarboxylic acids with unsaturated alcohols and or unsaturated amines, such as diallyl maleate, diallyl succinate, triallyl 1,3,5-benzenetricarboxylate.

The dispersants of the invention are used as additives for lubricants and fuels. The lubricants are additive-containing synthetic, semi-synthetic and mineral oils, preferably those which are used as engine oils. The synthetic oils comprise synthetic esters and polymers of α-olefins. The dispersant additives are added to the lubricants in any conventional way, in general as a concentrate in an inert solvent, such as a mineral oil. These concentrates may contain further conventional additives, such as rust inhibitors, antiwear agents, detergents, antioxidants and pour point improvers.

In fuels such as gasoline or diesel fuel, the additive products can be used as detergents for keeping the intake system clean. Owing to their dispersant properties, they also have an advantageous effect on engine lubricants which they may enter during operation of the engine. A fuel composition comprising a hydrocarbon which boils in a gasoline or diesel boiling range and from 20 to 5000 parts per million, based on weight of the fuel, of a dispersant additive of the invention is an embodiment of the invention.

The VTPP copolymers of the invention are also appropriate for use in conventional thermal Ene reactions and phenol allcylations to produce dispersant intermediates. For example, phenol can be alkylated with VTPP under conditions such as disclosed in U.S. Pat. No. 3,736,353. The resulting VTPP alkylated phenols are converted to Mannich dispersants under conditions such as described in U.S. Pat. No. 3,736,357. Another example, an Ene reaction between VTPP and MAN yields alkenyl-substituted succinic anhydride which can be converted into an alkenyl succinic ester-amide (see U.S. Pat. No. 4,873,009) or into an alkenyl succinimide (see U.S. Pat. No. 4,234,435) or into an alkenyl succinic triazole (see U.S. Pat. No. 5,080,815).

The following examples illustrate the practice and advantages achievable by the practice of this invention. These examples are not intended to limit, do not limit, and should not be construed as limiting the generic scope of this invention.

EXAMPLES

Preparation of Vinyl Terminated Propene Polymers (VTPP) and Copolymers

The following examples are representative preparations of the vinyl terminated propene polymers and copolymers utilized in this invention. The metallocenes used in these preparations, bis(pentamethylcylcopentadienyl) zirconium dichloride and bis(pentamethylcylcopentadienyl) hafnium dichloride, were supplied by Strem Chemicals and the methylaluminoxane was supplied by Albemarle Corporation.

The molecular weights of the VTPP and copolymers were determined according to the following procedure. A 0.5 wt. % solution of the product in tetrahydrofuran was injected onto three gel permeation chromatography columns (PL Gel 5 μm) connected in series with pore sizes 100, 500, and 1000 Å. The columns were eluted with tetrahydrofuran. Molecular weights were determined by comparison of retention times of the product to the retention times of polyisobutene. The polyisobutene molecular weights were determined by comparison of retention times of the polyisobutene to retention times of polystyrene standards. Polydispersity is defined as number average molecular weight divided by the weight average molecular weight (Mn/Mw).

The VTPP and copolymers were characterized by nuclear magnetic resonance (NMR) and Infrared Spectroscopy. The vinyl substituent of the VTPP and copolymers is characterized by a proton NMR olefinic resonance around 5.75 and around 5.0 parts per million (ppm) and carbon 13 NMR carbon resonances around 137 and 115 ppm. Decoupled $^{13}$C NMR experiments offer definitive identification of the vinyl substituent. The vinyl terminated polymers and copolymer are spectroscopically distinguished from vinylidene terminated polymer which exhibit proton NMR olefinic resonances around 4.6 ppm and $^{13}$C NMR olefinic carbon resonances around 145 and 112 ppm.

The VTPP and copolymers are characterized by Infrared spectroscopy olefinic absorbance around 1641, 973, and 911 wavenumbers.

Example 1

A 1 liter pressure reactor (Parr) was introduced into a oxygen and water free inert atmosphere glove box. The reactor bottom was charged with 1.51 g of a 1.00 wt. % toluene solution of bis(pentamethylcylcopentadienyl) zirconium dichloride, 100 ml of toluene, and 15.21 g of a toluene solution of methylaluminoxane (4.70 wt. % aluminum). The catalyst, toluene, and methylaluminoxane utilized were oxygen and water free. The pressure reactor was sealed and removed from the inert glove box. The reactor contents were cooled to 0° C. and then charged with 450 g of liquid propene. The reactor contents were stirred and heated to 40° C. Reaction held at 40° C. for 6 hrs. Reaction cooled to 10° C. and catalyst deactivated via introduction of 5 ml of methanol from a pressured vessel. Reactor vented of excess propene and liquid polymer transferred to separatory funnel. The mixture was washed twice with 60 ml of 10% aqueous hydrochloric acid followed by two 60 ml saturated sodium bicarbonate washes. The resulting organic layer was phase separated and filtered through filter aid to remove any insolubles. Solvents and lighter boiling fractions were removed in vacuo (150° C. @1 torr). Reaction afforded 386 g of vinyl terminated polypropene polymer. The polymer was analyzed by gel permeation chromatography and found to have a number average molecular weight of 1826 and a polydispersity of 1.73.

Example 2

A 0.5 liter pressure reactor (Parr) was introduced into a oxygen and water free inert atmosphere glove box. The reactor bottom was charged with 0.52 g of a 1.00 wt. % toluene solution of bis(pentamethylcylcopentadienyl) hafnium dichloride catalyst, 50 ml of toluene, and 5.75 g of a toluene solution of methylaluminoxane (4.70 wt. % aluminum). The catalyst, toluene, and methylaluminoxane utilized were oxygen and water free. The pressure reactor was sealed and removed from the inert glove box. The reactor contents were cooled to 0° C. and then charged with 172 g of liquid propene. The reactor contents were stirred at 0° C. and the reaction held at 0° C. for 6 hrs. The catalyst was deactivated via introduction of 5 ml of methanol from a pressured vessel. Reactor was vented of excess propene and resulting liquid polymer was transferred to a separatory funnel. The mixture was washed twice with 30 ml of 10% aqueous hydrochloric acid followed by two 30 ml saturated sodium bicarbonate washes. The resulting organic layer was phase separated and filtered through a filter aid to remove any insolubles. Solvents and lighter boiling fractions were removed in vacuo (150° C. (@1 torr). Reaction afforded 155 g of vinyl terminated polypropene polymer. The polymer was analyzed by gel permeation chromatography and found to have a number average molecular weight of 1220 and a polydispersity of 1.52.

Example 3

A 0.5 liter pressure reactor (Parr) was introduced into a oxygen and water free inert atmosphere glove box. The reactor bottom was charged with 0.78 g of a 1.00 wt. % toluene solution of bis(pentamethylcylcopentadienyl) zirconium dichloride catalyst, 50 ml of toluene, and 10.82 g of a toluene solution of methylaluminoxane (4.70 wt.% aluminum). The catalyst, toluene, and methylaluminoxane utilized were oxygen and water free. The pressure reactor was sealed and removed from the inert glove box. The reactor contents were cooled to 0° C. and then charged with 40.3 g of liquid 1-butene. The reactor was then charged with 120 g of liquid propene. The reactor contents were stirred and heated to 35° C. Reaction held at 35° C. for 6 hrs. Reaction was cooled to 10° C. and catalyst was deactivated via introduction of 5 ml of methanol from a pressured vessel. Reactor was vented of excess propene and resulting liquid polymer was transferred to a separatory funnel. The mixture was washed twice with 25 ml of 10% aqueous hydrochloric acid followed by two 25 ml saturated sodium bicarbonate washes. The resulting organic layer was phase separated and filtered through filter aid to remove any insolubles. Solvents and lighter boiling fractions were removed in vacuo (150° C. @1 torr). Reaction afforded 88.3 g of vinyl terminated polypropene/butene copolymer. The copolymer was analyzed by vapor pressure osmometry and found to have a number average molecular weight of 722.

Example 4

A 0.5 liter pressure reactor (Parr) was introduced into a oxygen and water free inert atmosphere glove box. The reactor bottom was charged with 0.78 g of a 1.00 wt. % toluene solution of bis(pentamethylcylcopentadienyl) zirconium dichloride catalyst, 50 ml of toluene, and 10.82 g of a toluene solution of methylaluminoxane (4.70 wt. % aluminum). The catalyst, toluene, and methylaluminoxane utilized were oxygen and water free. The pressure reactor was sealed and removed from the inert glove box. The reactor contents were cooled to 0° C. and then charged with 33.6 g of liquid butene. The reactor was then charged with 151 g of liquid propene. The reactor contents were stirred and heated to 40° C. The reaction was held at 40° C. for 3 hrs, then cooled to 10° C. The catalyst was deactivated via introduction of 5 ml of methanol from a pressured vessel. The reactor was vented of excess propene and resulting liquid polymer was transferred to a separatory funnel. The mixture was washed twice with 25 ml of 10% aqueous hydrochloric acid followed by two 25 ml saturated sodium bicarbonate washes. The resulting organic layer was phase separated and filtered through filter aid to remove any insolubles. Solvents and lighter boiling fractions were removed in vacuo (150° C. @1 torr). Reaction afforded 103 g of vinyl terminated polypropene/butene polymer. The polymer was analyzed by vapor pressure osmometry and found to have a number average molecular weight of 700.

Example 5

A 0.5 liter pressure reactor (Parr) equipped for syringe injection was placed under a oxygen and water free atmosphere. The reactor bottom was charged with 0.83 g of a 1.00 wt. % toluene solution of bis(pentamethylcylcopentadienyl) zirconium dichloride, 50 ml of toluene, and 9.40 g of toluene solution of methylaluminoxane (4.70 wt. % aluminum). The catalyst, toluene, and methylaluminoxane utilized were oxygen and water free. The pressure reactor was sealed and removed from the inert glove box. The reactor contents were cooled to 0° C. and then charged with 100 g of liquid propene. The reactor contents were stirred and heated to 17° C. Reaction held at 17° C. for 6 hrs. Reaction cooled to 10° C. and catalyst deactivated via introduction of 5 ml of methanol from a pressured vessel. Reactor vented of excess propene and liquid polymer transferred to separatory funnel. The mixture was washed twice with 25 ml of 10% aqueous hydrochloric acid followed by two 25 ml saturated sodium bicarbonate washes. The resulting organic layer was phase separated and filtered through filter aid to remove any insolubles. Solvents and lighter boiling fractions were removed in vacuo (150° C. @1 torr). Reaction affords 96 g of vinyl terminated polypropene polymer. The polymer was analyzed by gel permeation chromatography and found to have a number average molecular weight of 1642 and a polydispersity of 1.72.

Free Radical Polymerization of VTPP and Copolymers with Maleic Anhydride

The VTPP/maleic anhydride copolymers are characterized by infrared (IR) spectroscopy and acid number determinations. The VTPP/maleic anhydride copolymers exhibit IR carbonyl absorbances at 1860±5 and 1770±5 wavenumbers.

The following procedure was utilized to determine the acid number values for the VTPP maleic anhydride copolymers. A known quantity of the VTPP/maleic anhydride was dissolved in a 1:1 kerosene:1-butanol mixture and titrated with sodium isopropoxide titrant to its potentiometric endpoint. The Acid number is calculated and divided by 56.1 to give and acid number in milliequivalents of KOH per gram of sample.

Example 6

A 5 L flask equipped with overhead stirrer, condenser, and thermocouple under a nitrogen atmosphere was charged with 1057 g of liquid polypropene. The polypropene was stereo-irregular and had a number average molecular weight by gel permeation chromatography of 1416 (polydispersity of 1.75). The polypropene was unsaturated containing more than 90% terminal vinyl groups. The polymer was heated with stirring under nitrogen to 150° C. A solution of 201.7 g of maleic anhydride in 1000 ml of xylene (previously filtered to remove hydrolysis contaminants) was added cautiously to the heated polypropene. After heating the resulting mixture to 145° C., 16.07 g of di-tert-butyl peroxide was added via syringe over 2 hours. The reaction temperature was maintained between 145°–147° C. during the peroxide addition. The reaction temperature was then raised over 1 hour to 155° C. and held at this temperature for 1 hour. Solvent and residual maleic anhydride were removed in vacuo. A total of 1209.3 g of VTPP/MAN copolymer product having an acid number of 1.45 milliequivalents (meq) of KOH/gram was recovered.

Example 7

A 500 ml flask equipped as in Example 6 under a nitrogen atmosphere was charged with 100 g of liquid polypropene. The polypropene was stereo-irregular and had a number average molecular weight by gel permeation chromatography of 1163 (polydispersity of 1.89). The polypropene was unsaturated containing more than 90% terminal vinyl groups. The polymer was heated with stirring under nitrogen to 110° C. A solution of 12.21 g of maleic anhydride in 110 ml of toluene was added cautiously to the heated polypropene. After heating the resulting mixture to 110° C., 0.53 g of 1,1'-azobis(cyclohexanecarbonitrile) (ABCN) was added. This mixture was heated at 110°–112° C. for 1 hour and an additional 0.47 g of ABCN was added. This was followed by another 1 hour of heating and a third addition of ABCN (0.51 g). This was followed by another 1 hour of heating and a forth charge of ABCN (0.50 g). This mixture was reacted one hour further and a fifth ABCN charge added (0.48 g). After another hour of heating, a final ABCN charge of 0.53 g was added. A total of 3.02 g of ABCN was added. The reaction temperature was raised to 115° C. for 1 hour. Solvent and residual maleic anhydride removed in vacuo with a final reaction temperature of 165° C. A total of 105.9 g of product with an acid number of 0.71 meq KOH/gram was isolated.

Example 8

A 500 ml flask equipped as in Example 6 under a nitrogen atmosphere was charged with 100 g of liquid polypropene. The polypropene was stereo-irregular and had a number average molecular weight by gel permeation chromatography of 1016 (polydispersity of 1.74). The polypropen6 was unsaturated containing more than 90% terminal vinyl groups. The polymer was heated with stirring under nitrogen to 110° C. Reaction performed as in Example 6, utilizing 19.3 g of maleic anhydride added as solid without solvent and 2.0 g of di-tert-butyl peroxide. A total of 107 g of VTPP/MAN copolymer product with an acid number of 1.12 meq KOH/gram was isolated.

Example 9

A 500 ml flask equipped as in Example 6 under a nitrogen atmosphere was charged with 100 g of liquid polypropene. The polypropene was stereo-irregular and had a number average molecular weight by gel permeation chromatography of 1016 (polydispersity of 1.74). The polypropene was unsaturated containing more than 90% terminal vinyl groups. Reaction performed as in Example 3, utilizing 19.3 g maleic anhydride added as a slurry in 100 g of process oil and 2.1 g of di-tert-butyl peroxide. Filtration of hydrolysis contaminants not performed. A total of 204 g of VTPP/MAN copolymer product was isolated with an acid number of 0.69 meq KOH/gram.

Comparative Example 1

A 250 ml flask equipped as in Example 6 under a nitrogen atmosphere was charged with 50 g of liquid polypropene. The polypropene was stereo-irregular and had a number average molecular weight by gel permeation chromatography of 1016 (polydispersity of 1.74). The polypropene was unsaturated containing more than 90% terminal vinyl groups. The polymer was heated with stirring under nitrogen to 150° C. Reaction performed as in Example 6, except a solution of 9.65 g maleic anhydride in 50 ml of xylene (previously filtered to remove hydrolysis contaminants) was added to the heated polymer. Reaction mixture maintained at 155° C. for 5 hours. No peroxide utilized in the reaction. Reaction product isolated as in Example 6. A total of 59.78 g of product isolated with an acid number of 0.054 meq KOH/gram was isolated.

The following Table 1 exemplifies various analogues utilizing the basic procedure detailed in Example #1. The following abbreviations are used in this table: VTPP denotes vinyl terminated polypropene, Mn denotes average number molecular weight, Pd denotes polydispersity, MAN denotes maleic anhydride, and DTBP denotes di-tert-butyl peroxide. The cited acid numbers are given in milliequivalents of KOH/gram.

mixture was heated to 120° C. and toluene/water azeotroped for 1 hour. The reaction temperature then raised to 150° C. over an additional 1 hour. Solvent and residual water removed in vacuo to afford 1561.4 of product.

Example 23

A 12 liter flask equipped as in Example 15 was charged with 1020.6 g of VTPP/MAN copolymer (Mn 1902, Acid #1.45 meq KOH/g), 1836.4 g of process oil, and 1000 ml of toluene. The mixture was heated to 85° C. with stirring under a continual nitrogen purge. A commercial polyethylene amine mixture comparable to tetraethylenepentamine, 183.3 g, was added to the above mixture over about 60 minutes. Upon addition of half the polyethylene amine, an additional 2000 ml of toluene was added to the reaction mixture. The remainder of the polyamine was added and a additional 2000 ml of toluene added to the reaction mixture.

TABLE 1

Vinyl Terminated Polypropene/Maleic Anhydride Copolymers
EXAMPLE 6 Analogues

| Example # | VTPP Mn (Pd) | VTPP (g) | MAN (g) | Xylene (ml) | DTBP (g) | Acid # (meq) | Product (g) |
|---|---|---|---|---|---|---|---|
| 10 | 1590 (1.87) | 805.0 | 138.1 | 600 | 12.20 | 1.37 | 918.6 |
| 11 | 1559 (1.90) | 805.0 | 140.4 | 600 | 12.19 | 1.37 | 957.1 |
| 12 | 2312 (1.74) | 826.3 | 85.5 | 400 | 12.79 | 0.85 | 918.9 |
| 13 | 2354 (1.84) | 125.0 | 18.3 | 100 | 1.98 | 1.19 | 145.8 |
| 14 | 2722 (1.64) | 50.3 | 5.1 | 60 | 1.00 | 0.81 | 50.2 |
| 15 | 989 (1.76) | 200.0 | 29.8 | 125 | 3.06 | 1.34 | 220.2 |
| 16 | 989 (1.76) | 200.0 | 44.7 | 175 | 3.08 | 1.61 | 238.1 |
| 17 | 1042 (1.51) | 160.1 | 44.7 | 175 | 2.99 | 1.99 | 205.7 |
| 18 | 967 (1.80) | 380.0 | 42.4 | 177 | 5.69 | 0.91 | 420.8 |
| 19 | 1386 (1.78) | 686.6 | 130.8 | 500 | 10.41 | 1.48 | 827.7 |
| 20 | 1735 (1.76) | 300.3 | 38.2 | 190 | 4.48 | 1.07 | 341.1 |
| 21 | 993 (1.72) | 360.1 | 98.1 | 175 | 5.64 | 1.66 | 432.8 |

Reactions of VTPP/MAN Copolymers and Nucleophilic Agents:

Functionalization with Amines

The VTPP/MAN/Amine products are characterized by Infrared Spectroscopy. Products exhibit infrared carbonyl absorbances at 1770±5 and 1700±5 wavenumbers (cm$^{-1}$).

Example 22

A 4 L resin kettle equipped with overhead stirrer, Dean Stark trap, and thermometer was charged with 600 g of VTPP/MAN copolymer (Mn 2214, Acid #1.37 meq KOH/g), 897.1 g of process oil, and 1600 ml of toluene. The mixture was heated to 110° C. with stirring under a continual nitrogen purge. A commercial polyethylene amine mixture comparable to tetraethylenepentamine, 103.7 g, was added to the above mixture over about 10 minutes. The resulting The resulting mixture was heated to 120° C. and toluene/water azeotroped for 1 hour. The reaction temperature then raised to 150° C. over an additional 1 hour with solvent removal. Solvent and residual water removed in vacuo to afford 3057.1 g of product.

The following Table 2 exemplifies various analogues utilizing the basic procedure detailed in Example #15. The following abbreviations are used in this table: VTPP denotes vinyl terminated polypropene, Mn denotes average number molecular weight, Pd denotes polydispersity, MAN denotes maleic anhydride, and PO #5 refers to a diluent process oil. Amines utilized are polyethylene amine mixtures analogous to tetraethylenepentamine. Solvent is toluene for the reactions conducted at temperatures other than 142° C. Xylene utilized as solvent for the 142° C. reactions.

TABLE 2

Vinyl Terminated Polypropene/Maleic Anhydride/Amine Dispersant Candidates
EXAMPLE 20 Analogues

| Example # | VTPP/MAN Mn (Pd) | VTPP/MAN (g) | Amine (g) | PO #5 (g) | Solvent (g) | Addition TEMP. | Product (g) |
|---|---|---|---|---|---|---|---|
| 24 | 2202 (1.82) | 638.0 | 109.8 | 936.5 | 2500 | 85 | 1651.6 |
| 25 | 2921 (1.74) | 653.4 | 68.5 | 904.7 | 1500 | 85 | 1608.0 |
| 26 | 2637 (1.79) | 98.9 | 12.6 | 139.8 | 400 | 85 | 238.9 |
| 27 | 2637 (1.79) | 49.9 | 6.47 | 70.5 | 175 | 85 | 124.1 |
| 28 | 1745 (1.64) | 100.2 | 20.4 | 151.6 | 250 | 110 | 267.9 |
| 29 | 1745 (1.64) | 91.6 | 18.80 | 138.6 | 150 | 142 | 244.3 |
| 30 | 2321 (1.57) | 75.9 | 19.8 | 89.9 | 350 | 90 | 168.9 |
| 31 | 2321 (1.57) | 78.6 | 12.5 | 73.3 | 350 | 90 | 160.4 |
| 32 | 1902 (1.78) | 97.2 | 17.4 | 92.7 | 300 | 85 | 203.4 |
| 33 | 1618 (1.64) | 99.9 | 19.4 | 149.5 | 500 | 85 | 250.9 |
| 34 | 2354 (1.85) | 2539 | 50.2 | 72.3 | 100 | 110 | 127.8 |

Functionalization with Aminoguanidine Bicarbonate

Example 35

A 0.5 L resin kettle equipped with overhead stirrer, Dean Stark trap, and thermometer was charged with 26.4 g of VTPP/MAN copolymer (Mn 1619, Acid #1.07 meq KOH/g), 35.4 g of process oil, 50 ml of toluene, and 3.8 g of aminoguanidine bicarbonate. The mixture was heated to 115° C. with stirring under a continual nitrogen purge. The resulting mixture was azeotroped for 2 hours with water and carbon dioxide removal. The reaction temperature was then raised to 150° C. over and held for 1 hour. Solvent and residual water removed in vacuo to afford 62.8 g of product.

Functionalization with Alkoxylated Amines

Example 36

A 0.5 L resin kettle equipped with overhead stirrer, Dean Stark trap, and thermometer was charged with 100 g of VTPP/MAN copolymer (Mn 2214, Acid #1.37 meq KOH/g), 157.16 g of process oil, 200 ml of toluene. The mixture was heated to 110° C. with stirring under a continual nitrogen purge. Hexamethylene diamine alkoxylated with 4 equivalents of propylene oxide, 23.9 g, was added to the above mixture over about 5 minutes. The resulting mixture was heated to 130° C. and toluene/water azeotroped for 1 hour. The reaction temperature then raised to and held at 190° C. for 4 hours. Solvent and residual water removed in vacuo to afford 259.6 g of product.

Post Treatment of VTPP/MAN/Amine Products

Example 37

A 0.5 L resin kettle equipped with overhead stirrer, Dean Stark trap, and thermometer was charged with 150 g of dispersant sample prepared in Example 23, and 70 ml of xylene. The mixture was heated to 150° C. with stirring under a continual nitrogen purge. Boric acid, 3.5 g, slurried in 50 ml of xylene added to the above mixture over about 20 minutes. The resulting mixture was heated to 150° C. and xylene/water azeotroped for 1 hour. The reaction temperature then raised to and held at 155° C. for 1 hour. Solvent and residual water removed in vacuo. Resulting product filtered to afford 131.2 g of product found to contain 0.17% boron and 1.51% nitrogen.

Example 38

A 0.5 L resin kettle equipped with overhead stirrer, Dean Stark trap, and thermometer was charged with 150 g of dispersant sample prepared in Example 23, and 25.5 g of boronating agent. The boronating agent employs boric acid suspended in Mannich condensation product of polybutylphenol, tetraethylenepentamine, and formaldehyde containing 2.7 wt.% boron. The mixture was heated to and held at 150° C. with stirring under a nitrogen purge for 2 hours. Reaction temperature then cooled to and maintained at 105° C. for 17 hours. The resulting product was filtered to afford 159.3 g of product found to contain 0.39% boron and 1.40% nitrogen.

Free Radical Polymerization of VTPP, MAN and Additional Unsaturated Reagents

Example 39

(VTPP/Maleic Anhydride/1,9-Decadiene)

A 500 ml flask equipped as in Example 6, was charged with 54.6 g of liquid polypropene and 0.83 g of 1,9-decadiene. The polypropene was stereo-irregular and had a number average molecular weight by gel permeation chromatography of 1416 (polydispersity of 1.75). The polypropene was unsaturated containing more than 90% terminal vinyl groups. The polymer and diene were heated with stirring under nitrogen to 150° C. A solution of 10.6 g of maleic anhydride in 50 ml of xylene (previously filtered to remove hydrolysis contaminants) was added cautiously to the heated polypropene. After heating the resulting mixture to 145° C., 1.0 g of di-tert-butyl peroxide was added via syringe over 2 hours. The reaction temperature is maintained between 145°–147° C. during the peroxide addition. The reaction temperature is then raised over 1 hour to 155° C. and held at this temperature for 1 hour. Solvent and residual maleic anhydride were removed in vacuo. A total of 62.2 g of terpolymer product having an acid number of 1.37 milliequivalents (meq) of KOH/gram and a Mn of 1758 (gel permeation chromatography) was recovered.

Example 40

(VTPP/Maleic Anhydride/1,9-Decadiene+Amine)

A 500 ml resin kettle equipped with overhead stirrer, Dean Stark trap, and thermometer was charged with 34.7 g of VTPP/Diene/MAN terpolymer from Example 39 (Mn 2214, Acid #1.37 meq KOH/g), 52.5 g of process oil, and 100 ml of toluene. The mixture was heated to 110° C. with stirring under a continual nitrogen purge. A polyethylene amine mixture comparable to tetraethylenepentamine, 6.0 g, was added to the above mixture over about 10 minutes. The resulting mixture was heated to 120° C. and toluene/water azeotroped for 1 hour. The reaction temperature then raised to 150° C. over an additional 1 hour. Solvent and residual water removed in vacuo to afford 86.19 of terpolymer product.

Example 41

(VTPP/MAN/Diallylformamide)

A 500 ml flask equipped as in Example 6, was charged with 50.1 g of liquid polypropene and 0.5 g of diallyformamide (DAF). The polypropene was stereo-irregular and had a number average molecular weight by gel permeation chromatography of 1416 (polydispersity of 1.75). The polypropene was unsaturated containing more than 90% terminal vinyl groups. The polymer and diallylformamide were heated with stirring under nitrogen to 150° C. A solution of 9.68 g of maleic anhydride in 40 ml of xylene (previously filtered to remove hydrolysis contaminants) was added cautiously to the heated polypropene. After heating the resulting mixture to 145° C., 1.1 g of di-tert-butyl peroxide was added via syringe over 2 hours. The reaction temperature was maintained between 145°–147° C. during the peroxide addition. The reaction temperature was then raised over 1 hour to 155° C. and held at this temperature for 1 hour. Solvent and residual maleic anhydride were removed in vacuo. A total of 59.82 g of terpolymer product having an acid number of 1.55 milliequivalents (meq) of KOH/gram an a Mn of 1719 (gel permeation chromatography) was recovered.

Example 42

(VTPP/Maleic Anhydride/Diallylformamide+Amine)

A 1 L resin kettle equipped with overhead stirrer, Dean Stark trap, and thermometer was charged with 44.38 g of VTPP/DAF/MAN terpolymer from Example 41 (Mn 1719, Acid #1.55 meq KOH/g), 66.4 g of process oil, and 175 ml of toluene. The mixture was heated to 110° C. with stirring under a continual nitrogen purge. A polyethylene amine mixture comparable to tetraethylenepentamine, 8.5 g, was added to the above mixture over about 10 minutes. The resulting mixture was heated to 120° C. and toluene/water azeotroped for 1 hour. The reaction temperature then raised to 150° C. over an additional 1 hour. Solvent and residual water removed in vacuo to afford 118.6 of product.

Example 43

(VTPP/MAN/Polybutene)

A 500 ml flask equipped as in Example 6, was charged with 100 g of liquid polypropene and 100 g of polybutene. The polypropene was stereo-irregular and had a number average molecular weight by gel permeation chromatography of 1016 (polydispersity of 1.75). The polypropene was unsaturated containing more than 90% terminal vinyl groups. The polybutene was Glissopal® 1000 supplied by BASF. The VTPP and polybutene were heated with stirring under nitrogen to 150° C. A solution of 45 g of maleic anhydride in 175 ml of xylene (previously filtered to remove hydrolysis contaminants) was added cautiously to the heated polypropene. After heating the resulting mixture to 145° C., 3.1 g of di-tert-butyl peroxide was added via syringe over 2 hours. The reaction temperature was maintained between 145°–147° C. during the peroxide addition. The reaction temperature was then raised over 1 hour to 155° C. and held at this temperature for 1 hour. Solvent and residual maleic anhydride were removed in vacuo. A total of 228.5 g of product having an acid number of 1.65 milliequivalents (meq) of KOH/gram was recovered.

Example 44

(VTPP/MAN/Polybutene+Amine)

A 1000 ml resin kettle equipped with overhead stirrer, Dean Stark trap, and thermometer was charged with 100 g of VTPP/MAN/Polybutene product from Example 43 (Acid #1.65 meq KOH/g), 151.0 g of process oil, and 275 ml of toluene. The mixture was heated to 110° C. with stirring under a continual nitrogen purge. A polyethylene amine mixture comparable to tetraethylenepentamine, 20.3 g, was added to the above mixture over about 10 minutes. The resulting mixture was heated to 120° C. and toluene/water azeotroped for 1 hour. The reaction temperature then raised to 150° C. over an additional 1 hour. Solvent and residual water removed in vacuo to afford 265.5. of product.

Alternative Reactions of VTPP and Conolymers

Example 45

(Phenol Alkylation)

A 1 l flask equipped as in Example 6 under a nitrogen atmosphere was charged with 267.4 g of liquid VTPP polypropene and 51.8 g of phenol/borontrifluoride complex. The polypropene was stereo-irregular and had a number average molecular weight by gel permeation chromatography of ~950 (polydispersity of 1.74). The resulting mixture was heated to and maintained at 49°–51° C. for 3 hours, and then neutralized with gaseous ammonia. The neutralized mixture was heated to 188° C. with nitrogen purge, then vacuum stripped for 2.5 hours, and filtered to afford 209.2 g of alkylated phenol. Infared analysis indicated the product was substantially para substituted (828 $cm^{-1}$). Gel permeation chromatographic analysis indicated the isolated product had a Mn of 1050 and was 83.6% active.

Example 46

(Mannich Reaction with VTPP Alkylated Phenol)

A 1 L flask equipped as in Example 6 under a nitrogen atmosphere was charged with 175 g of the alkylated phenol from Example 36, 9.17 g of diethylenetriamine, 0.4 g of oleic acid, and 50 ml of xylene. The resulting mixture was heated to 80° C. and 13.31 g of formalin was added over 30 minutes. This mixture then heated to 165° C. for 3 hours with removal of water, followed by vacuum stripping for removal of residual water and solvent. The mixture was filtered to afford 148.7 g of product.

Example 47

(Ene Reaction of VTPP)

A 100 ml pressure reactor (Parr) was flushed with nitrogen and charged with 40 g of liquid propene/1-hexene copolymer, 9.0 g of maleic anhydride and 9.8 mg of 1,3-dibromo-5,5-dimethyl-hydantoin (supplied by Aldrich Chemical Co.). The propene/1-hexene copolymer was stereo-irregular and had a number average molecular weight of 700 by vapor pressure osmometry. The propene/1-hexene copolymer was unsaturated containing more than 90% terminal vinyl groups. The reactor was sealed after flushing the head space with nitrogen and the contents were heated to 235° C. The reaction mixture was maintained at 235° C. for 14 hours. The reaction mixture was then cooled to ~150° C.

and contents transferred to a flask. Residual maleic anhydride was removed in vacuo. A total of 37.9 g of product having an acid number of 1.21 milliequivalents (meq) of KOH/gram was recovered. Chromatographic separation on silica gel eluted with heptane to remove unreacted starting copolymer demonstrates an 84 % conversion for the ene reaction.

Example 48

(Ene Reaction of VTPP)

A 100 ml pressure reactor (Parr) was flushed with nitrogen and charged with 40 g of liquid polypropene, 5.8 g of maleic anhydride and 9.2 mg of 1,:t-dibromo-5,5-dimethylhydantoin (supplied by Aldrich Chemical Co.). The polypropene was atactic and noncrystalline, or stereo-irregular, and had a number average molecular of weight of 742 by vapor pressure osmometry. The polypropene was unsaturated containing more than 90% terminal vinyl groups. The reactor was sealed after flushing the head space with nitrogen and the the contents were heated to 235° C. The reaction mixture was maintained at 235° C. for 14 hours. The reaction mixture was then cooled to ~150° C. and contents transferred to a flask. Residual maleic anhydride was removed in vacuo. A total of 42.6 g of product having an acid number of 1.01 milliequivalents (meq) of KOH/gram was recovered. Chromatographic separation on silica gel eluted with heptane to remove unreacted starting copolymer demonstrates an 81% conversion for the ene reaction.

Application Examples

The products produced as in Examples 22, 26, 32, Commercial dispersant 1 (HiTEC© 7049 Mannich dispersant supplied by Ethyl Corp.) and Commercial dispersant 2 (HiTEC© 646 succinimide dispersant supplied by Ethyl Corp.) were blended into a motor oil formulation utilizing metal-containing sulfonates, zinc dithiophosphate wear inhibitors, antioxidants, a pour point depressant, and a viscosity index improver supplied by Shell Chemical Company (Shellvis 260). The blend with 7 wt. % Commercial dispersant 1 and 7 wt %. of the viscosity index improver gave a 100° C. viscosity of 10.33 cSt., while Commercial dispersant 2 gave a 100° C. viscosity of 10.59 cSt. The blend with the dispersant of Example 22 gave a viscosity of 14.83 cSt at 100° C., the blend with the dispersant of Example 26 gave a viscosity of 16.96 cSt at 100° C., and the blend with dispersant of Example 32 gave a viscosity of 19.87 cSt at 100° C. Dispersants of example 22, 26, 32, and Commercial dispersant 1 were of nearly equal activities (around 40 wt. %), while Commercial dispersant 2 was at a higher activity of 65 wt. %. The dispersants of this invention (Examples 22, 26, and 32) impart significantly higher 100° C. viscosities to motor oil formulations than the Commercial dispersants 1 or 2 by virtue of the advantageous special structure of the VTPP/MAN copolymer intermediates of this invention. Table 3 details the advantageous 100° C. viscometrics exhibited by other dispersants of this invention.

TABLE 3

VTPP/MAN/AMINE DISPERSANTS
VISCOMETRICS (100° C. VIS & -25° C. COLD CRANK)

| Sample | Dispersant Wt. % | 100° C. VIS (cSt) | -25° C. Cold Crank (cP) |
|---|---|---|---|
| Commercial 1 | 7.00 | 10.59 | 3300 |
| Commercial 2 | 7.00 | 10.33 | 3920 |
| EXAMPLE 22 | 7.00 | 14.83 | 2970 |
| EXAMPLE 24 | 7.00 | 14.01 | 2930 |

TABLE 3-continued

VTPP/MAN/AMINE DISPERSANTS
VISCOMETRICS (100° C. VIS & -25° C. COLD CRANK)

| Sample | Dispersant Wt. % | 100° C. VIS (cSt) | -25° C. Cold Crank (cP) |
|---|---|---|---|
| EXAMPLE 25 | 7.00 | 12.15 | 13140 |
| EXAMPLE 26 | 7.00 | 16.96 | 3430 |
| EXAMPLE 27 | 7.00 | 14.26 | 3360 |
| EXAMPLE 28 | 7.00 | 12.57 | 2770 |
| EXAMPLE 29 | 7.00 | 12.57 | 2770 |
| EXAMPLE 30 | 7.00 | 12.22 | 2870 |
| EXAMPLE 31 | 7.00 | 11.28 | 2950 |
| EXAMPLE 32 | 7.00 | 19.87 | 2870 |
| EXAMPLE 33 | 7.00 | 12.24 | 3070 |
| EXAMPLE 36 | 7.00 | 13.06 | 3440 |
| EXAMPLE 37 | 7.00 | 12.94 | 3160 |

More importantly, the dispersants of this invention impart significant 100° C. viscosity lift to finished oils with no adverse effects on low temperature viscometrics. The dispersants of this invention were blended into motor oils formulations utilizing metal-containing sulfonates, zinc dithiophosphate wear inhibitors, antioxidants, a pour point depressant, and a viscosity index improver supplied by Shell Chemical Company (Shellvis 260). Blends with wt. % dispersant and 7 wt. % viscosity index improver easily meet the 5W-30 low temperature -25° C. cold crank simulator specification of less than 3500 centipoise (cP). The excellent -25° C. cold crank simulator performance of oils formulated with dispersants of this invention are depicted in Table 3. The blend with 7 wt. % Commercial dispersant 1 and 7 wt %. of the viscosity index improver gave a -25° C. cold crank simulator viscosity of 3300 cP, while a conventional succinimide dispersant, Commercial dispersant 2, gave a failing -25° C. cold crank simulator viscosity of 3920 cP. The blend with the dispersant of Example 22 gave a -25° C. cold crank simulator viscosity of 2970 cP, and the blend with dispersant of Example 32 gave a -25° C. cold crank simulator viscosity of 2870 cP.

The products produced as in Examples 22, 24, & 32, Commercial dispersant 1 and Commercial dispersant 2 were blended into 5W-30 motor oils formulated with metal containing sulfonates, zinc dithiophosphate wear inhibitors, antioxidants, a pour point depressant, and a viscosity index improver supplied by Shell Chemical Company (Shellvis 260). With 7 wt. % of the Commercial dispersant 1 or Commercial dispersant 2, 7 wt. % of the viscosity index improver was necessary to meet a viscosity target of 10.3 -to 10.6 cSt. On the other hand, with the dispersant of Example 24 at 7 wt. % concentration in the finished oil requires only 3 wt. % of the same viscosity index improver to afford a 100° C. viscosity of 10.82 cSt. Likewise, the dispersant of Example 32 at 7 wt. % concentration in the finished oil and 2.5 wt. % of the same viscosity index improver, the oil viscosity was well above the target range. This oil had a 100° C. viscosity of 12.48 cSt.

These results show the ability of the dispersants of this invention to contribute significant VI Credit to the oil and thereby enable reduction of the amount of conventional VI Improver required to achieve a desired viscosity target. Reducing the amount of VI Improver in a motor oil can thus offer both cost and engine cleanliness advantages. Table 4 details viscosity index credit advantages exhibited by other dispersants of this invention.

TABLE 4

VTPP/MAN/AMINE DISPERSANTS VISCOSITY INDEX CREDIT

| SAMPLE | BASESTOCK | Dispersant Wt. % | VII Wt. % | VISCOSITY 100° C. (cSt) | −25° C. COLD CRANK (cP) |
|---|---|---|---|---|---|
| Example 24 | Group I | 7.00 | 7.00 | 15.05 | 3470 |
| Example 24 | Group I | 7.00 | 3.00 | 10.82 | 3200 |
| Example 24 | Group I | 7.00 | 1.00 | 9.19 | 3950 |
| Example 32 | Group I | 7.00 | 7.00 | 19.87 | 2870 |
| Example 32 | Group I | 7.00 | 4.00 | 13.67 | 2830 |
| Example 32 | Group I | 7.00 | 2.50 | 12.48 | 3070 |
| Example 22 | Group II | 4.50 | 7.00 | 13.32 | 3000 |
| Example 22 | Group II | 4.50 | 4.00 | 10.41 | 2760 |
| Example 22 | Group II | 4.50 | 3.00 | 9.18 | 2700 |

The dispersants of this invention offer excellent and surprising blending properties by virtue of imparting both VI Credit and desirable low temperature viscometrics. The dispersants of this invention tolerate larger amounts of heavy basestocks than conventional dispersants while maintaining a desired viscosity grade. Blends formulated with higher amounts of heavy basestock afford motor oils with improved volatility. The products produced as in Examples 24, Commercial dispersant 1 (Mannich), and Commercial dispersant 2 (succinimide) were blended into a motor oil formulation utilizing metal-containing sulfonates, zinc dithiophosphate wear inhibitors, antioxidants, a pour point depressant, and a VI Improver supplied by Shell Chemical Company (Shellvis 260), and mixture of a light and heavy basestock, Ashland 100 HF and Ashland 325 HF. The blend with 7 wt. % Commercial dispersant 1, 7 wt %. of the VI Improver, and 6 wt. % Ashland 325 gave a 100° C. viscosity of 10.33 cSt and a −25° C. cold crank simulator viscosity of 3300 cP, while Commercial dispersant 2 gave a 100° C. viscosity of 10.59 cSt and a failing −25° C. cold crank simulator viscosity of 3920 cP. A blend containing 7 wt. % of the dispersant of Example 24, 7 wt. % of VI Improver, and 6 wt. % Ashland 325 HF gave a viscosity of 14.01 cSt at 100° C. and a −25° C. cold crank simulator viscosity of 2930 cP. A blend with 7 wt. % of the dispersant of Example 24, 3 wt. % of the viscosity index improver, and 15 wt. % Ashland 325 HF gave a viscosity of 10.8 cSt at 100° C. and a −25° C. cold crank simulator viscosity of 3200 cP. While the blend with Commercial dispersant 2 fails to meet the 5W-30 grade with only 6 wt. % of the heavy basestock Ashland 325 HF, and Commercial dispersant 1 is only borderline 5W-30 with 6 wt. % of the heavy basestock, the dispersants of this invention tolerate up to 15 wt %. heavy basestock and maintain the 5W-30 vis grade. Thus, the dispersants of this invention offer the advantage of finished oils with improved volatility by tolerating higher concentration of heavy basestocks, which permits a reduction in the amount of more costly and more volatile lighter basestocks.

The ability of the dispersants of this invention to resist oxidative thickening and to disperse engine sludge was measured in a oxidative thickening bench test where the dispersant formulated in a motor oil is oxidatively stressed in the presence of severely used oil from a Sequence VE engine test. This used oil is viscous and serves as a source of engine sludge. The oil formulated with the test dispersant was heated at 160° C. with the introduction of air throughout the test duration of 168 hours. Sample taken at regular intervals throughout the test are monitored for viscosity increase and spot dispersancy. Lower viscosity increases indicate a better resistance to oxidative thickening. Ten drops of the stressed oil are dropped onto Whatman No. 3031915 blotter paper for spot dispersancy evaluation. After 16 hours, the diameters of the inner ring of dispersancy and the outer oil ring are measured. The percent spot dispersancy is the diameter of the inner ring, divided by the diameter of the outer ring, times 100. Spot dispersancy values above 70% are indicative of good dispersancy. Without dispersant, values of 36 to 38% are obtained. This test procedure is described in Example 1 of U.S. Pat. No. 4,908,145.

The Commercial dispersant 1 blended into a motor oil formulation utilizing metal-containing sulfonates, zinc dithiophosphate wear inhibitors, antioxidants, a pour point depressant, and a VI Improver supplied by Shell Chemical Company (Shellvis 260) at 7 wt. % gave a 156 percent viscosity increase and a spot dispersancy of 91% in the oil thickening bench test. This commercial dispersant exhibits excellent properties in the Sequence VE test and the Sequence IIIE test. The inventive dispersant of Example 22 blended at 7 wt. % into the same formulation as above gave only a 6.1 percent viscosity increase and a spot dispersancy of 93%. The dispersant of Example 25 blended into a 7 wt. % in the same formulation as above gave only a 25.6 percent viscosity increase and a spot dispersancy of These results demonstrate that the dispersants of this invention achieve both excellent oxidative stability and dispersancy. Table 5 details oxidative stability and dispersancy exhibited by other dispersants of this invention.

TABLE 5

VTPP/MAN/AMINE DISPERSANTS OXIDATIVE STABILITY & DISPERSANCY (OIL THICKENING TEST)

| Sample | VII Wt. % | Viscosity Increase @ 168 HRS. | Spot Dispersancy Ratio |
|---|---|---|---|
| Commercial 1 | 7.00 | 156.5 | 91% |
| Commercial 2 | 7.00 | 25.4 | 71% |
| Example 22 | 7.00 | 6.1 | 93% |
| Example 22 | 3.50 | 25.0 | 80% |
| Example 34 | 7.00 | 12.7 | 74% |
| Example 24 | 7.00 | 40.3 | 77% |
| Example 25 | 7.00 | 25.6 | 82% |
| Example 37 | 7.00 | 60.7 | 92% |
| Example 38 | 7.00 | 55.6 | 98% |
| Example 22 | 7.00 | 18.7 | 94% |

The ability of the dispersants of this invention to enhance the fuel economy of a finished motor oil was measured in a fuel economy bench test. The Commercial dispersant blended into a motor oil formulation utilizing metal-containing sulfonates, zinc dithiophosphate wear inhibitors, antioxidants, a pour point depressant, and a viscosity index improver supplied by Shell Chemical Company (Shellvis 260) at 7 wt. % affords marginal Sequence VI-A engine test performance (0.90% enhanced fuel efficiency increase). The passing enhanced fuel efficiency increase limit for the Sequence VI-A engine test is ≧1.1%. In the fuel economy bench test, this blend with Commercial dispersant 1 gives a predicted enhanced fuel efficiency increase of 0.91%. The dispersants of Examples 24 and 25 give predicted enhanced fuel efficiency increase values of 1.26 and 1.38 in the fuel economy bench test. These results indicate the dispersants of this invention offer valuable fuel economy benefits to finished crankcase oils. Table 6 depicts the enhanced fuel economy increase (EFEI) predicted for other dispersants of this invention.

TABLE 6

Fuel Economy Bench Test Results
VTPP/MAN/Amine Dispersants
5W-30 OILS

| SAMPLE | BASESTOCK | DISPERSANT Wt. % | EFEI (Predicted) |
| --- | --- | --- | --- |
| Commercial | Group I | 7.00 | 0.91 |
| Example 24 | Group I | 7.00 | 1.26 |
| Example 25 | Group I | 7.00 | 1.38 |
| Commercial | Group II | 4.50 | 1.07 |
| Example 22 | Group II | 4.50 | 1.43 |

In addition to the foregoing advantages achievable by the practice of this invention is the fact that propylene has been historically less expensive than isobutylene or mixed butene streams. This cost differential may increase with increase use of isobutylene and other butenes to produce oxygenated blending agents, such as methyl tert-butyl ether for use in gasoline and other fuels.

These and other embodiments will be apparent from a consideration of this specification and the appended claims.

What is claimed is:

1. A copolymer of an unsaturated acidic reactant and an atactic propene polymer, said propene polymer having a major amount of polymer chains containing terminal vinyl unsaturation, having a number average molecular weight of at least 500, and comprising at least 70 weight per cent propene and 0 to 30 weight per cent of at least one olefin selected from the group consisting of $C_2$ and $C_4$ to $C_{10}$ olefins, and said unsaturated acidic reactant comprising at least one unsaturated $C_4$ to $C_{10}$ carboxylic acid or anhydride or acid derivative.

2. A copolymer according to claim 1 wherein the unsaturated acidic reactant comprises at least one unsaturated $C_4$ to $C_{10}$ dicarboxylic acid or anhydride or acid derivative.

3. A copolymer according to claim 1 wherein the unsaturated acidic reactant is maleic or fumaric acid or anhydride or acid derivative selected from the group consisting of acid chloride, acid bromide, and lower alkyl acid ester derivatives.

4. A copolymer according to claim 1 wherein the unsaturated acidic reactant is maleic acid or anhydride.

5. An oil soluble dispersant additive useful in oleaginous compositions comprising product prepared by contacting the copolymer of claim 2 with at least one nucleophilic reagent selected from the group consisting of amines, alcohols, metal reactants and mixtures thereof under conditions effective to form adducts of the nucleophilic reagent with the copolymer.

6. The dispersant additive according to claim 5 wherein the nucleophilic reagent is a polyalkylene polyamine containing 3 to 6 amino groups per molecule.

7. The dispersant additive according to claim 6 wherein the unsaturated acidic reactant is maleic acid or anhydride.

8. A lubricant composition which comprises an oil of lubricating viscosity and a dispersant effective mount of a dispersant additive according to claim 6.

9. A fuel composition comprising a hydrocarbon which boils in a gasoline or diesel boiling range and from 20 to 5000 parts per million of a dispersant additive according to claim 6.

10. The dispersant additive according to claim 7 wherein the polyamine comprises tetraethylene pentamine.

11. The dispersant additive according to claim 5 wherein the nucleophilic reagent is an N-substituted poly(hydroxyalkyl)amine or a mixture of a polyamine and a polyol.

12. The dispersant additive according to claim 11 wherein the unsaturated acidic reactant is maleic acid or anhydride.

13. A lubricant composition which comprises an oil of lubricating viscosity and a dispersant effective amount of a dispersant additive according to claim 11.

14. A fuel composition comprising a hydrocarbon which boils in a gasoline or diesel boiling range and from 20 to 5000 parts per million of a dispersant additive according to claim 11.

15. The dispersant additive according to claim 5 wherein the nucleophilic reagent is a basic salt of aminoguanidine.

16. The dispersant additive according to claim 15 wherein the unsaturated acidic reactant is maleic acid or anhydride.

17. A lubricant composition which comprises an oil of lubricating viscosity and a dispersant effective amount of a dispersant additive according to claim 15.

18. A fuel composition comprising a hydrocarbon which boils in a gasoline or diesel boiling range and from 20 to 5000 parts per million of a dispersant additive according to claim 15.

19. The dispersant additive according to claim 6 which has been contacted with one or more post-treating agents selected from the group consisting of inorganic or organic phosphorus compounds, inorganic or organic sulfur compounds, boron compounds, and mono- or poly-carboxylic acids and derivatives thereof.

20. The dispersant additive according to claim 19 wherein the post-treating agent is an inorganic phosphorus acid or anhydride, an inorganic sulfurous acid, bode acid, an unsaturated dicarboxylic acid or derivative, or precursor thereof, or a mixture of these.

21. The dispersant additive according to claim 11 which has been contacted with one or more post-treating agents selected from the group consisting of inorganic or organic phosphorus compounds, inorganic or organic sulfur compounds, boron compounds, and mono-or poly-carboxylic acids and derivatives thereof.

22. The dispersant additive according to claim 21 wherein the post-treating agent is an inorganic phosphorus acid or anhydride, an inorganic sulfurous acid, boric acid, an unsaturated dicarboxylic acid or derivative thereof, or precursor thereof, or a mixture of these.

23. A lubricant composition which comprises an oil of lubricating viscosity and a dispersant effective mount of a dispersant additive according to claim 19 wherein the unsaturated acidic reactant is maleic acid or anhydride.

24. A lubricant composition which comprises an oil of lubricating viscosity and a dispersant effective mount of a dispersant additive according to claim 21 wherein the unsaturated acidic reactant is maleic acid or anhydride.

25. The copolymer of claim 1 further comprising alkylvinylidene olefin.

26. An oil soluble dispersant additive useful in oleaginous compositions comprising product prepared by contacting the copolymer of claim 25 with at least one nucleophilic reagent selected from the group consisting of mines, alcohols, metal reactants and mixtures thereof under conditions effective to form adducts of the nucleophilic reagent with the copolymer.

27. The dispersant additive according to claim 26 wherein the nucleophilic reagent is a polyalkylene polyamine containing 3 to 6 amine groups per molecule.

28. The dispersant additive according to claim 27 wherein the unsaturated acidic reactant is maleic acid or anhydride.

29. A lubricant composition which comprises an oil of lubricating viscosity and a dispersant effective amount of a dispersant additive according to claim 27.

30. A fuel composition comprising a hydrocarbon which boils in a gasoline or diesel boiling range and from 20 to 5000 parts per million of a dispersant additive according to claim 27.

31. The dispersant additive according to claim 26 wherein the nucleophilic reagent is an N-substituted poly(hydroxyalkyl)amine or a mixture of a polyamine and a polyol.

32. The dispersant additive according to claim 31 wherein the unsaturated acidic reactant is maleic acid or anhydride.

33. A lubricant composition which comprises an oil of lubricating viscosity and a dispersant effective amount of a dispersant additive according to claim 31.

34. A fuel composition comprising a hydrocarbon which boils in a gasoline or diesel boiling range and from 20 to 5000 parts per million of a dispersant additive according to claim 31.

35. The dispersant additive according to claim 26 wherein the nucleophilic reagent is a basic salt of aminoguanidine.

36. A lubricant composition which comprises an oil of lubricating viscosity and a dispersant effective amount of a dispersant additive according to claim 35.

37. A fuel composition comprising a hydrocarbon which boils in a gasoline or diesel range and from 20 to 5000 parts per million of a dispersant additive according to claim 35.

38. The dispersant additive according to claim 35 wherein the unsaturated acidic reactant is maleic acid or anhydride.

39. The copolymer of claim 1 further comprising at least one di- or polyethylenically unsaturated compound which is polymerizable with said unsaturated acidic reactant and said atactic propene polymer.

40. The copolymer of claim 39 wherein said di- or polyethylenically unsaturated compound is a linear $\alpha,\omega$ diene.

41. An oil soluble dispersant additive useful in oleaginous compositions comprising product prepared by contacting the copolymer of claim 39 with at least one nucleophilic reagent selected from the group consisting of amines, alcohols, metal reactants and mixtures thereof under conditions effective to form adducts of the nucleophilic reagent with the copolymer.

42. The dispersant additive according to claim 41 wherein the nucleophilic reagent is a polyalkylene polyamine containing 3 to 6 amine groups per molecule.

43. The dispersant additive according to claim 42 wherein the unsaturated acidic reactant is maleic acid or anhydride.

44. A lubricant composition which comprises an oil of lubricating viscosity and a dispersant effective amount of a dispersant additive according to claim 42.

45. A fuel composition comprising a hydrocarbon which boils in a gasoline or diesel boiling range and from 20 to 5000 parts per million of a dispersant additive according to claim 42.

46. The dispersant additive according to claim 41 wherein the nucleophilic reagent is an N-substituted poly(hydroxyalkyl)amine or a mixture of a polyamine and a polyol.

47. The dispersant additive according to claim 46 wherein the unsaturated acidic reactant is maleic acid or anhydride.

48. A lubricant composition which comprises an oil of lubricating viscosity and a dispersant effective amount of a dispersant additive according to claim 46.

49. A fuel composition comprising a hydrocarbon which boils in a gasoline or diesel boiling range and from 20 to 5000 parts per million of a dispersant additive according to claim 46.

50. The dispersant additive according to claim 41 wherein the nucleophilic reagent is a basic salt of aminoguanidine.

51. The dispersant additive according to claim 50 wherein the unsaturated acidic reactant is maleic acid or anhydride.

52. A lubricant composition which comprises an oil of lubricating viscosity and a dispersant effective amount of a dispersant additive according to claim 50.

53. A fuel composition comprising a hydrocarbon which boils in a gasoline or diesel boiling range and from 20 to 5000 parts per million of a dispersant additive according to claim 50.

54. A lubricant composition which comprises an oil of lubricating viscosity and a dispersant effective amount of a dispersant additive according to claim 5.

55. A method of use which comprises operating an internal combustion engine having in lubricating contact therewith the lubricant composition of claim 54.

56. An improved method of obtaining increased VI Credit in a lubricating oil composition for use in an internal combustion engine, said improvement comprising the incorporation into said lubricating oil of a dispersant effective amount of the dispersant additive of claim 5, whereby the VI Credit is increased relative to a comparable lubricating oil composition without said dispersant.

57. An improved method of obtaining increased dispersancy and oxidative stability in a lubricating oil composition for use in an internal combustion engine, said improvement comprising the incorporation into said lubricating oil a dispersant amount of the dispersant additive of claim 5, whereby the dispersancy and oxidative stability is increased relative to a comparable lubricating oil composition without said dispersant.

58. An improved automobile internal combustion engine said improvement comprising having in lubricating contact therewith the lubricating composition of claim 54.

59. An oil soluble dispersant additive useful in oleaginous compositions comprising product prepared by contacting the copolymer of claim 1 with at least one nucleophilic reagent selected from the group consisting of amines, alcohols, metal reactants and mixtures thereof under conditions effective to form adducts of the nucleophilic reagent with the copolymer.

60. A lubricant composition which comprises an oil of lubricating viscosity and a dispersant effective amount of a dispersant additive according to claim 59.

61. A fuel composition comprising a hydrocarbon which boils in a gasoline or diesel boiling range and from 20 to 5000 parts per million of a dispersant additive according to claim 59.

62. The copolymer reaction product made by the free radical polymerization of an unsaturated acidic reactant and an atactic propene polymer, said propene polymer having a major amount of polymer chains containing terminal vinyl unsaturation, having a number average molecular weight of at least 500, and comprising at least 70 weight per cent propene and 0 to 30 weight per cent of at least one olefin selected from the group consisting of $C_2$ and $C_4$ to $C_{10}$ olefins, and said unsaturated acidic reactant comprising at least one unsaturated $C_4$ to $C_{10}$ carboxylic acid or anhydride or acid derivative.

\* \* \* \* \*

UNITED STATES PATENT AND TRADEMARK OFFICE
CERTIFICATE OF CORRECTION

PATENT NO. : 5,616,153
DATED : April 1, 1997
INVENTOR(S) : Carl A. Mike, Joseph J. Valcho, Daniel Yuan-Fu Yu It is certified that error appears in the above-indentified patent and that said Letters Patent is hereby corrected as shown below:

Column 11, Line 12, the word number should read weight and the last word in the same line weight should read number.
Column 11, Line 13, (Mn/Mw) should read (Mw/Mn).

Column 21, Example 48, Line 41, 10.59 should read 10.54.
Column 21, Table 3, Line 63, Column 3 on the 1st line of the table, 10.59 should read 10.33.
Column 21, Table 3, Line 64, Column 3 on the 2nd line of the table, 10.33 should read 10.54.

Column 22, Line 16, EXAMPLE 36 should read EXAMPLE 37.
Column 22, Line 17, EXAMPLE 37 should read EXAMPLE 38.

Column 23, Table 4, Column 6, Line 3, 3950 should read 2950.
Column 23, Line 35, 10.59 should read 10.54.

UNITED STATES PATENT AND TRADEMARK OFFICE
CERTIFICATE OF CORRECTION

PATENT NO. : 5,616,153
DATED : April 1, 1997
INVENTOR(S) : Carl A. Mike, Joseph J. Valcho, Daniel Yuan-Fu Yu It is certified that error appears in the above-indentified patent and that said Letters Patent is hereby corrected as shown below:

In column 22, line 8, the 1st line in the 4th column of the table, 13140 should read 3140.

Signed and Sealed this

Twenty-second Day of July, 1997

Attest:

Attesting Officer

BRUCE LEHMAN

Commissioner of Patents and Trademarks